United States Patent
Pacheco Tanaka et al.

(10) Patent No.: US 12,385,107 B2
(45) Date of Patent: Aug. 12, 2025

(54) PROCESS FOR THE RECOVERY AND RECYCLING OF MATERIALS THAT CONSTITUTE SUPPORTED PALLADIUM MEMBRANES

(71) Applicant: HYDROGEN ONSITE, S.L., Derio (ES)

(72) Inventors: David Alfredo Pacheco Tanaka, San Sebastiàn (ES); Margot Anabell Llosa Tanco, San Sebastiàn (ES); Ekain Fernández, San Sebastiàn (ES); Jon Melendez, San Sebastiàn (ES); Alba Arratibel, San Sebastiàn (ES)

(73) Assignee: HYDROGEN ONSITE, S.L., Derio (ES)

( * ) Notice: Subject to any disclaimer, the term of this patent is extended or adjusted under 35 U.S.C. 154(b) by 492 days.

(21) Appl. No.: 16/955,860

(22) PCT Filed: Sep. 10, 2018

(86) PCT No.: PCT/EP2018/074347
§ 371 (c)(1),
(2) Date: Jun. 19, 2020

(87) PCT Pub. No.: WO2019/120649
PCT Pub. Date: Jun. 27, 2019

(65) Prior Publication Data
US 2020/0318218 A1    Oct. 8, 2020

(30) Foreign Application Priority Data

Dec. 22, 2017    (ES) .............................. ES201731460

(51) Int. Cl.
*C22B 11/00* (2006.01)
*B01D 71/02* (2006.01)
(Continued)

(52) U.S. Cl.
CPC ...... *C22B 11/048* (2013.01); *B01D 71/02231* (2022.08); *B01D 71/02232* (2022.08);
(Continued)

(58) Field of Classification Search
CPC ....... C22B 11/048; C22B 1/005; C22B 7/002; C22B 7/007; C22B 11/025; C22B 11/026;
(Continued)

(56) References Cited

U.S. PATENT DOCUMENTS

2009/0049954 A1    2/2009    Shore et al.

FOREIGN PATENT DOCUMENTS

| EP | 3329023 A1 * | 6/2018 | ........... C22B 11/046 |
| JP | 2003138323 A * | 5/2003 | |
| JP | 2004181412 A * | 7/2004 | |

OTHER PUBLICATIONS

Feng et al., "Effect of surface oxidation on the surface condition and deuterium permeability of a palladium membrane," Applied Surface Science 257 (2011) 9852-9857. (Year: 2011).*

(Continued)

*Primary Examiner* — Sally A Merkling
*Assistant Examiner* — Logan Edward Laclair
(74) *Attorney, Agent, or Firm* — CANTOR COLBURN LLP

(57) ABSTRACT

A process for recycling and reusing supported Pd membranes includes the separation of the Pd (or Pd alloy) layer from the support by contacting the Pd membrane with hydrogen under pressure and at low temperature and then with a second gas that is different from hydrogen. The Pd layer separated from the support can then be treated to solubilize the Pd and, where appropriate, the alloy metal(s) to obtain salts that can be reused, for example in the preparation of new Pd membranes. The recovered supports are also reusable.

12 Claims, 1 Drawing Sheet

(51) Int. Cl.
*C22B 1/00* (2006.01)
*C22B 7/00* (2006.01)
*C22B 11/02* (2006.01)

(52) U.S. Cl.
CPC .............. *C22B 1/005* (2013.01); *C22B 7/002* (2013.01); *C22B 7/007* (2013.01); *C22B 11/025* (2013.01); *C22B 11/026* (2013.01); *C22B 11/046* (2013.01)

(58) Field of Classification Search
CPC ... C22B 11/046; C22B 11/021; C22B 11/042; B01D 69/12; B01D 71/022; B01D 67/00; B01D 65/02; Y02P 10/20
See application file for complete search history.

(56) References Cited

OTHER PUBLICATIONS

International Search Report issued Dec. 14, 2018 re: Application No. PCT/EP2018/074347, pp. 1-4, citing: JP 2003 138323 A, US 2009/0049954 A1 and Shigeyuki Uemiya et al.
Shigeyuki Uemiya et al, "Hydrogen Permeable Palladium-Silver Alloy Membrane Supported on Porous Ceramics", Journal of Membrane Science, Elsevier BV, NL, vol. 56, No. 3, Mar. 1, 1991 (Mar. 1, 1991), p. 315-325, XP000176959.
Written Opinion issued Dec. 14, 2018 re: Application No. PCT/EP2018/074347, pp. 1-4, citing: JP 2003 138323 A and US 2009/0049954 A1.

* cited by examiner

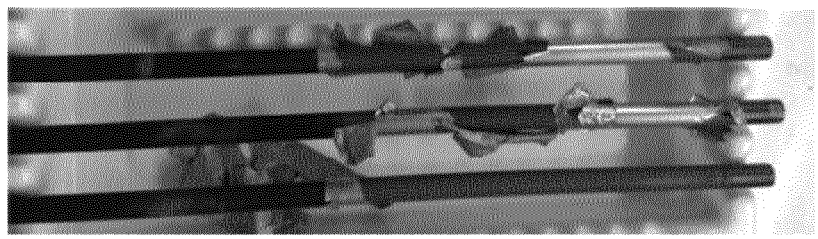

PROCESS FOR THE RECOVERY AND RECYCLING OF MATERIALS THAT CONSTITUTE SUPPORTED PALLADIUM MEMBRANES

TECHNICAL FIELD

The disclosure relates to the process for recycling and reusing supported Pd membranes, which comprises the separation of the Pd layer from the support taking advantage of the process of embrittlement of the Pd layer which comprises the formation of Pd hydride when the membrane is contacted with hydrogen at low temperature. The Pd layer separated from the support can be recycled by solubilizing the components of the Pd layer to obtain salts that can be reused, for example in the preparation of new Pd membranes. The support can also be reused, for example, by depositing a new layer of Pd on it.

BACKGROUND

The demand for hydrogen in the industrial sector is growing continuously, due to its numerous applications. In particular, its use as an energy source is becoming increasingly attractive, especially in view of the development and growth of new sources of energy more environmentally friendly.

In this scenario, research efforts are continuing for the technical and economic optimization of hydrogen separation methods, which satisfy the current purity needs, and low cost required by the numerous final applications of hydrogen. In this framework palladium membranes for the separation and purification of hydrogen from various sources have received increasing interest. The palladium membranes have a comparatively very high hydrogen flow and an exclusive selectivity and permeance for hydrogen due to the unique permeation mechanism.

Apart from the use of Pd membranes for the separation and purification of H2, it is known in the state of the art to integrate Pd membranes in catalytic reactors known as Pd membrane reactors in which reactions are carried out in which there is hydrogen production such as steam reforming or autothermal reforming of different raw materials (for example: methane, methanol, ethanol and other hydrocarbons). These membrane reactors allow the extraction of generated hydrogen, producing pure hydrogen eliminating thus the need to have hydrogen purification units downstream of the reformer, thus reducing the reactor volume and also the reaction temperature (less expensive materials are required). Although the use of Pd membrane reactors at large-scale today is not feasible, mainly because of the cost of Pd and the support; the use of Pd alloy membranes on a smaller scale is very promising. Both in the Pd membranes and in the Pd membrane reactors, defects can appear with time due to the conditions of use, shortening their useful life. Due to its high cost, the recyclability of the components of supported Pd membranes is an interesting option to reduce the cost of this type of Pd membranes or of the Pd membrane reactors. Recycling is interesting to be applied not only to the used and defective membranes, but also to the manufactured Pd membranes that do not have good permeation properties or that are damaged during handling, storage or assembly.

The recycling of the supported Pd alloy membranes can actually be achieved by treating it with strong acids and oxidizing agents. Li Y. et al disclose the recycling of Pd from Pd membranes supported in alumina by treatment with 2 mol/L HCl and 1 mol/L $H_2O_2$. This method is not suitable for all supported Pd membranes, since depending on the nature of the support, the support can be damaged preventing it from being recycled and reused. Thus, the use of concentrated acids or bases, for example, $H_2SO_4$ (>20%), $H_3PO_4$ (>10%), $HNO_3$ (>15%) and NaOH (>15%) are not appropriate when the support is porous ceramic.

In the state of the art the application WO 2017/017647 A1 is known, which discloses a process for recovery and recycling of materials that constitute tubular membranes of Pd—Ag supported on a steel substrate comprising a step of hydrometallurgical leaching of Pd and Ag able to preserve the integrity of this particular type of support made of steel. At the beginning of the disclosed process, the surface of the steel substrate must be protected with an epoxy resin to allow the leaching agent to exclusively attack the Pd—Ag layer. The extraction of the leached Pd and Ag is then carried out during the hydrometallurgical treatment in a strong acid and oxidizing leaching medium: $3M\ HNO_3 + 1\%$ by volume of $H_2O_2$ (30% vol). The contact time is 3 h 30 min, the temperature 60° C. and agitation speed 300 rpm. The leaching liquor obtained is treated with activated carbon at 20° C. for the elimination of the present Pd; then, the acid is neutralized with $CaCO_3$ to eliminate iron and silver nitrates by precipitation (iron nitrate being an index of the change of the support). The liquor is then filtered to separate the metal precipitates, and in addition $Ca(NO_3)_2$ is obtained by evaporating the solvent at 100° C.

BRIEF DESCRIPTION OF THE FIGURES

FIG. 1 is an image of the delamination of a supported Pd layer where the support is porous metallic.

DETAILED DESCRIPTION

The present disclosure provides a simpler process, less time consuming, and more economic, that can be carried out under such conditions, that make possible to recycle and reuse both the support on one side and the membrane of Pd on the other side.

The present disclosure provides a process capable of recycling, for recovering and reusing the support and the Pd layer separately, in which acids or corrosive chemicals are not used to separate the Pd layer from the support, and which therefore is more environmentally friendly, and which does not chemically damage the support, so that it can advantageously be reused again.

The present disclosure provides a process that allows, after separating the Pd membrane from the support, to isolate the Pd layer, and to recover from it, the Pd, and when appropriate, the metal or metals of the Pd alloy, that can be reused thereafter, for example, to fabricate supported Pd membranes.

The present disclosure overcomes at least in part the disadvantages of the state of the art mentioned above, providing in a first aspect a process for recycling supported Pd membranes comprising the following steps:

i) Contacting a supported Pd membrane in a container with a gas comprising hydrogen at a hydrogen partial pressure equal to or greater than 1 kPa and at a temperature equal to or lower than 150° C., ii) Removing the hydrogen from the reactor by contacting the supported Pd membrane with a gas other than hydrogen.

The process of the disclosure can advantageously be used to recycle any type of supported Pd membrane, independently of the nature of the support since the mildness of the process conditions does not modify it chemically, and this allows it's recycling. Examples of supports usually used in supported Pd membranes, which can be recycled by the process of the disclosure are supports of metal (for example: iron, iron alloys, such as stainless steels, copper, copper alloys, nickel, nickel alloys and combinations thereof), of materials such as glass, ceramics, such as α-alumina, γ-alumina, zirconia, yttria-stabilized zirconia (YSZ), titania, ceria, and mixtures of ceramic materials such as alumina-zirconia, zeolite or of organic polymer, or mixtures thereof, among other materials.

The supports confer mechanical stability to the Pd membranes, so that the thickness of the membrane can be substantially reduced and with it the cost, while at the same time the H2 permeation flow is improved.

The supported Pd membranes comprise a support and a Pd layer which can be deposited directly on the support or on an intermediate layer located between the support and the Pd layer.

It is generally known that the surface on which the Pd membrane is deposited must have a small and uniform pore size distribution, and be smooth, since the surface roughness and the presence of large pores inhibit the deposition of the thin palladium membrane.

The asymmetric porous ceramic has a good surface quality to support very thin Pd-based membranes (<5 μm).

The porous metallic supports have high mechanical resistance, offer good resistance to thermal shock, their coefficient of thermal expansion is similar to that of Pd, and can be easily assembled in metal reactors; however, on the one hand, it is difficult to manufacture metal supports with a small and uniform pore size distribution, and also, the metallic support can be reduced in the presence of hydrogen, and the material of the support can diffuse towards the Pd membrane forming an alloy that considerably reduces hydrogen permeation.

For this reason, it is common practice in the art for metallic supports to comprise the above mentioned intermediate layer. These intermediate layers can be, for example, of the ceramic type, such as alumina, vanadium oxide, nickel, or nitride, and improve the surface properties and/or minimize the risk of migration of Pd to the support.

An example of a known in the art support, susceptible of being recycled according to the process of the disclosure is that cited in the application WO2017017647 A1 consisting of a porous asymmetric metallic substrate of 316L stainless steel, and an intermediate layer of TiN.

With respect to the supported Pd membrane that can be subjected to the recycling process of the disclosure there is no limitation; that is, it can be any Pd membrane or simply a layer of Pd that is deposited on a substrate, although it does not perform the actual function of a supported Pd membrane. In this sense, the term "supported Pd membrane" should be interpreted in the context of the disclosure. Pd membranes are especially interesting and advantageous in certain applications, because they have a high hydrogen flow and excellent permeation and exclusive selectivity for hydrogen.

Examples of supported Pd membranes are for example the supported Pd membranes which are used in the art for the separation and purification of $H_2$, for example from synthesis gas.

Also supported Pd membranes are those which are integrated in catalytic reactors known as Pd membrane reactors in which certain chemical reactions take place that generate hydrogen, and which couple the separation of the hydrogen from the rest of a mixture of gases; in general, there are two types of catalytic membrane reactors: compact bed and fluidized bed. These types of chemical reactions are, for example, steam reforming, water-gas shift reaction, dehydrogenation of alkanes, or autothermal reforming of different raw materials (for example: carbon monoxide, methane, methanol, ethanol and other hydrocarbons).

The supported Pd membranes that can be subjected to the process of the disclosure can have variable Pd layer thicknesses, within a wide range. The typical thicknesses of this type of membranes are usually limited, and are between 0.1 and 500 μm. Preferably the thicknesses are for example between 0.1 and 25 μm, or between 0.5 and 20 μm, or between 1 and 15 μm, or between 2 and 5 μm.

The dimensions and shapes of the supported Pd membranes are variable. They are known in the form of disks, plates, tubes, etc.

The supported Pd membranes in the context of the present disclosure comprise a Pd layer or comprise a Pd alloy layer. Pd alloys can be alloys with a metal (binary alloys), alloys with two metals (ternary alloys) or alloys with three or more alloying metals. Generally, the Pd alloys of the membranes are alloys with one (binary) or with two metals (ternary). The alloying metal or metals modify the properties of the membranes that only contain Pd, and confer them diverse characteristics, depending on the metal or metals of the alloy, and their percentages in the alloy. In this sense some elements of the alloy confer greater permeability of hydrogen; other elements, such as Cu, confer more resistance to the poisoning of same by gases containing sulfur (S) as the $H_2S$, present for example in natural gas, which progressively reduce the $H_2$ permeation, and end up destroying the membranes.

Examples of metals of the Pd alloys are Ag, Au, Cu, Gd, Y, Ru, In, Nb, V, Ta.

Some examples of supported Pd membranes that can be recycled by the process of the disclosure, are the membranes with alloying metals such as Au and/or Ag, i.e., Pd—Ag, Pd—Au and Pd—Ag—Au. For Pd—Ag membranes, Ag percentages are usually between 1% and 30%, for example between 5 and 25%, or between 10 and 20%. For Pd—Au membranes, Au percentages are usually between 1% and 10%, for example between 2% and 8%, or for example between 3 and 5%. For Pd—Ag—Au membranes, the Ag percentages are usually between 1% and 25%, and the Au percentages are usually between 1% and 10%.

Some non-limiting examples of concrete alloys of supported Pd membranes are Pd—Ag30%, Pd—Ag23%, Pd—Au5%, Pd—Cu40%, Pd—Cu20%, Pd—Gd11.4%, Pd—Y9%, Pd92Ag5Au3.

The conditions of temperature and hydrogen partial pressure under which the supported Pd membrane is contacted in step i) vary depending on the composition of the Pd layer of the supported membrane. The conditions in each case can be easily determined by the expert in the field.

In general it has been found that the temperature at which step i) is carried out may be equal to or less than 150° C. In some examples of the process the temperature is equal to or less than 100° C., preferably equal to or less than 70° C., more preferably equal to or less than 30° C., even more preferably equal to or less than 25° C., and even more preferably equal to or less than 20° C. In some examples of the process of the disclosure, the temperature at which it is carried out can be comprised between 150° C. and 0° C., or for example between 125° C. and 10° C., or for example between 100° C. and 20° C., or for example between 80° C. and 25° C.

It has also been found that in general the hydrogen partial pressure in the reactor can be equal to or greater than 1 kPa. In some examples of the process the hydrogen partial pressure is equal to or greater than 5 kPa, preferably equal to or greater than 25 kPa, more preferably equal to or greater than 50 kPa, even more preferably 80 kPa and even more preferably equal to or greater than 100 kPa. According to an example of the process of the disclosure, the pressure is 101 kPa (1 atm). In some other examples of the process of the disclosure the hydrogen pressure at which it can be carried out is between 100 kPa and 400 kPa, or for example between 150 kPa and 350 kPa, or for example between 200 and 300 kPa. In other examples of the process of the disclosure the hydrogen pressure at which it can be carried out is between 200 kPa and 4000 kPa, for example between 500 kPa and 3500 kPa, or for example between 750 and 3000 kPa, or between 1000 and 2000 kPa.

According to a particular embodiment of the process of the disclosure, the hydrogen partial pressure is 101 kPa (1 atm) and the temperature is between 0° C. and 100° C., for example between 20° C. and 80° C., or for example between 25° C. and 70° C. or for example between 30° C. and 50° C. These conditions for step i) of the process are suitable for Pd—Ag membranes.

According to another particular embodiment of the process of the disclosure, the hydrogen partial pressure is between 150 and 200 kPa and the temperature is between 0° C. and 100° C., for example between 20° C. and 80° C., or for example between 25° C. and 70° C. or for example between 30° C. and 50° C. These conditions for step i) of the process are applicable to Pd—Ag membranes.

In general, the gas comprising hydrogen used in step i) can be any gas containing H2.

In a preferred embodiment, the gas comprising hydrogen used in step i) of the process of the disclosure is pure H2, that is, the commercially available H2 that presents degrees of purity which depend on the supplier (for example, of concentration >99.95% of Praxair). In these cases, the hydrogen partial pressure of the disclosure is equivalent to the total hydrogen pressure.

In other examples of the process of the disclosure, a gas is used in which the amount of H2 can vary within a wide range. In some embodiments, a gas is used that may have 1% v/v or less of hydrogen. In other examples of the process the amount of hydrogen in the gas can be equal to or greater than 1% v/v, for example between 1% and 99.90%, or for example between 20% and 90%, or for example between 25% and 85%, or for example between 30% and 80%. A gas with an amount of H2 of for example between 40 and 70%, or between 50 and 60% can also be used.

Alternatively, in another example of the process of the disclosure, a gas is used that contains H2 that can be generated in situ by a chemical reaction.

The container that can be used to implement the process of the disclosure can be any that does not chemically interfere with the process and that resists the H2 pressures needed. In an example of the process of the disclosure, the container used to carry it out is a quartz tube. In this case the supported Pd membrane is placed inside and the hydrogen gas can be introduced into the tube to achieve a pressure of 101 kPa (1 atm). These conditions of step i) can for example be achieved by introducing a flow of pure hydrogen, such as a flow of 1 L/min.

In another embodiment of the process of the disclosure, the container is a reactor, such as a stainless steel reactor, for example a 316L stainless steel reactor. The supported Pd membrane is disposed therein, and then a hydrogen-containing gas is introduced until a partial pressure as defined above is achieved.

In process step i) it is important that a temperature equal to or lower than the critical α-β phase transition temperature is reached. This critical temperature varies for each type of supported Pd membrane, depending on the metals of the alloy and its proportion or proportions, and depending on the hydrogen pressure, and can be easily determined by a person skilled in the art by conventional tests. For the particular case of membranes, whose layer is only of Pd, the temperature at which the phase transition of α to β takes place and with it the embrittlement of hydrogen is around 200° C. at a hydrogen pressure of 200 kPa, and, around 30° C. at a pressure of 2 kPa. For Pd alloy membranes at the same pressure, critical temperatures are typically lower than those of the membranes of only Pd. In the case of the supported Pd—Ag membranes, the inventors have observed that depending on the percentage of Ag, the critical temperature, at a given hydrogen pressure, varies in such a manner that, increasing the percentage in Ag decreases the critical temperature. Thus, in an example of the process for a Pd—Ag membrane with a content of 1% Ag, the hydrogen partial pressure is 200 kPa and the process temperature is about 200° C. or lower. In another example of the process for a Pd—Ag membrane with a content of 5% Ag, the hydrogen partial pressure is 200 kPa and the process temperature is about 170° C. or lower. In another example of the process for a Pd—Ag membrane with a content of 10% Ag, the hydrogen partial pressure is 200 kPa and the process temperature is approximately 150° C. or lower.

According to an exemplary embodiment of step i) of the process, the supported Pd membrane is put in contact in a container (for example a suitable reactor) with hydrogen at a partial pressure greater than about 101 kPa (1 atm), for example, at 150 kPa, and at a temperature equal to or lower than 150° C., and after this pressurization of the container, under these conditions, the container is depressurized.

The combination of a pressurization of the container with hydrogen, followed by a depressurization of the container, constitutes in the present disclosure what is called a cycle. According to an example of the process of the disclosure, step i) comprises carrying out, at least, one pressurization followed by a depressurization. Thus, according to an exemplary embodiment of the process of the disclosure, it comprises carrying out a single cycle. In another embodiment of the process, two cycles are carried out. In another embodiment of the process, three cycles are carried out. In a further example of the process, four cycles are carried out. Generally the process of the disclosure comprises carrying out between 1 and 6 cycles, for example between 2 and 5, or for example between 3 and 4. In any case the expert can easily determine the number of suitable cycles for each supported Pd membrane.

After the depressurization of the only cycle, or of the last cycle, when appropriate, or after stopping the gas flow comprising hydrogen in the corresponding container, the hydrogen remaining in the container is removed. In this sense the process of the disclosure comprises step ii) in which the hydrogen from step i) is removed from the container and the supported Pd membrane is put in contact with a gas other than hydrogen in the container. This operation can be carried out by purging the container, and introducing said gas.

The inventors of the present disclosure have observed that during the process of the disclosure the following occurs. First, the H2 with which the supported Pd membrane is contacted, is absorbed by the Pd membrane, forming palladium hydride (PdH). As the proportion of PdH increases, a phase transition from α to β of the crystalline network of the Pd membrane takes place, which involves an expansion of the same, since the phase β is an expanded structure with respect to the phase α. The expansion of the network involves severe stresses that produce fissures and deformations. When, when appropriate, the depressurization is carried out, part of the hydrogen that is present in the membrane is desorbed, which generates another phase change from β to α and more stresses. This results in the embrittlement of the Pd layer. Sometimes a cycle of pressurization and depressurization is sufficient to achieve embrittlement and ensure the subsequent release of the Pd layer. In other cases, it has been seen that it is better to carry out more than one cycle in order to achieve adequate embrittlement, and to favor this detachment. Then, in step ii) the remaining hydrogen is removed from the container, for which the supported Pd membrane is put in contact with a gas other than hydrogen. In this step ii) the remaining hydrogen is desorbed from the Pd layer, and this contributes further to the embrittlement. Finally, all these changes, stresses, fissures, lead to the Pd layer being peeled and detached like a film, from the support at the end of the process of the disclosure.

Step ii) can be carried out in several alternative ways. According to one embodiment, an inert gas, for example $N_2$, He, or Ar, can be used as other gas different from hydrogen. Preferably nitrogen is used due to its lower cost. Nitrogen can have a high purity (>99.998%) but it is also possible to use N2 of low purity (>90%). Mixtures of inert gases such as $N_2$, He, or Ar can also be used. In another example of the process, air is used as a gas other than hydrogen.

In an example of the process of the disclosure when the container is a quartz tube, the gas containing hydrogen is purged, and replaced by a gas other than hydrogen.

This gas can, for example, be introduced by a flow of said gas, for example, at of 1 L/min. When the container is a reactor, for example of stainless steel, step ii) can be carried out by simply opening the reactor, so that the gas containing hydrogen is removed and the gas other than hydrogen is introduced.

After step ii) it is observed in some cases that the Pd layer of the support has already been detached from the support. In this case, the support and the Pd layer are removed separately from the container. In other cases when this detachment is not observed yet, the supported Pd membrane can be left inside the container in contact with air, or it can be removed from the container and be contacted with air, and it is observed that after a certain time the Pd layer, typically in a few minutes, ends up detaching from the support.

FIG. 1 shows how the Pd layer detaches from the support, as if it were peeling. Generally, the Pd layer is completely detached, in the form of the film shown in FIG. 1. On the other hand, apart from the Pd layer, it is observed that the support remains intact, without having undergone chemical modifications. This has the advantage that it can be reused as support for example for the manufacture of new membranes. On the other hand, the peeled Pd layer of the support serves to obtain from it the metals that constitute it.

After the separation of the Pd (or Pd alloy) layer from the support, each of them can be recovered independently. Therefore, the process of the disclosure can additionally comprise obtaining, from the Pd layer separated from the support, the Pd or the constituent metals of the alloy. In this way, the process of the disclosure also allows the recovery of generally expensive metals, such as Pd, and its alloying elements. Ag, Au, etc., with the economic advantage that this implies. For example, the metals thus recycled can then be reused for the manufacturing of new Pd membranes whose manufacturing cost will be much lower than if commercially available materials where used as starting materials.

The obtaining the constituent metals of the Pd membrane from it, is based on solubilizing the Pd or metals of the corresponding alloy. Solubilization can, for example, be carried out by oxidation and formation of the corresponding cations. A solution containing $Pd^{2+}$ is thus obtained, and optionally other cation/s of the metals of the alloy in question. Depending on the alloy these can be for example $Ag^+$, $Au^{1+}$, $Cu^{2+}$ among others. The cations can then be separated from one another. For example, the cations can be precipitated in the form of different salts so that they can be isolated and recovered separately. In particular, they can advantageously be obtained in the form of salts which can then be used as precursors in manufacturing processes of these membranes, such as, for example, in the form of Pd chloride, Pd acetate, or silver chloride.

Numerous processes are known in the state of the art for the preparation of these membranes, for which reason, the compounds that can serve as precursors in these processes, and which are therefore reusable in their manufacturing, are evident for the skilled person. The most common methods for its production are chemical vapor deposition (CVD), physical vapor deposition (PVD), electrodeposition (EDP) and electroless plating (ELP). Among them, ELP is very cost effective and simple, and is generally the preferred manufacturing method. It is based on the autocatalytic reduction of metal salt complexes on the surface of a support, or on an intermediate layer deposited on the support.

Therefore, the process of the disclosure may further comprise the following step:

Contacting the Pd layer previously separated from the support in a reaction medium comprising at least one oxidant of Pd and, when appropriate, of the metals of the Pd alloy, and at least one solubilizer.

The conditions of this step can vary depending on the metals of the Pd alloy, and the way in which it is desired to separate them. The reaction medium is usually water but can be mixtures of water with an organic solvent.

As an oxidant, any chemical compound capable of oxidizing the metal or metals of the Pd layer can be used.

Examples of oxidants are nitric acid, $H_2O_2$, perchloric acid, hypochlorite, or chlorate.

According to a preferred embodiment, nitric acid is used. The oxidant transforms the metal in its oxidation state (0) to an oxidized state (cation).

In the context of the present disclosure, the term solubilizer is to be understood as any chemical compound capable of maintaining the Pd cations, and, if appropriate, the cations of other alloy metals in solution. The person skilled in the art can in each case easily determine compounds that act as solubilizers. Typical solubilizers include inorganic acids or organic acids, and compounds able to form complexes with these cations. Examples of these acids are $H_2SO_4$, hydrochloric acid, acetic acid. Examples of complexing compounds are chloride anion ($Cl^-$), which can be used, for example, as NaCl, $NH_3$, alkali or alkaline earth salts of acetates, citrates, or also ionic liquids.

In an example of the process of the disclosure, the Pd layer is put in contact with an aqueous solution of nitric acid (oxidant and solubilizer) and hydrochloric acid (solubilizer). According to an exemplary embodiment for Pd—Ag layers, nitric acid is used as the oxidant and chloride anion as a solubilizer. The Pd can be recovered as salts of the anion $[PdCl_4]^{-2}$, and the Ag of the alloy can be recovered from the medium with chloride anion, in which case AgCl precipitates insoluble in the medium, which can then be isolated.

This step of the process can be carried out with or without stirring, preferably with stirring which favours the chemical reactions. It is also possible to raise the temperature if this favours the chemical processes that take place.

The products resulting from the process of the disclosure can be used for the manufacture of new membranes for example by electroless plating. Thus salts such as $PdCl_2$, $Pd(NO_3)_2$, $PdBr_2$ or palladium acetate serve to prepare plating baths with hydrazine as reducing agent.

Here below examples are presented to illustrate the process of the disclosure that should not be in any way considered as limiting the scope thereof.

EXAMPLES

Example 1: Recycling of PdAg Membranes on Metal Supports

Three palladium-silver membranes (silver content approximately 8%) of 3-4 μm thickness supported on 1 cm diameter Hastelloy X metallic tubes, were treated individually. The membrane M38 was introduced into a 316L stainless steel reactor and the reactor pressurized at 150 kPa with hydrogen at room temperature (about 20° C.). After half an hour, the reactor was depressurized and immediately re-pressurized. In total, three cycles of pressurization and depressurization were carried out. Then, the reactor was purged to remove all hydrogen. The membrane of the reactor was removed and it was observed that the silver PdAg layer was wrinkled (embrittled). The membrane was left to the environment for 15 minutes. During this time, it was observed that the Pd—Ag layer began to spontaneously delaminate. The PdAg layers of the M39 and M40 membranes were delaminated using the same procedure as for the M38, with the difference that 200 kPa of pressure was used and in the M40 membrane two cycles were used (Table A). Membranes M39 and M40 also suffered from spontaneous delamination.

| Parameter | Membrane | | |
|---|---|---|---|
| | M38 | M39 | M40 |
| Pressurization with hydrogen (kPa) | 150 | 200 | 150 |
| Pressurization and depressurization cycles | 3 | 3 | 2 |

Example 2. Recycling of PdAg Membranes on Porous Ceramic Supports

Five membranes of PdAg (approximate silver content 6-8%) supported on the external surface of 1 cm diameter asymmetric alumina tubes (the pore size of the surface is 100 nm) were introduced into a quartz tube which was fed with hydrogen (1 Lmin$^{-1}$) at room temperature (approximately 25° C.) for 2 hours. Subsequently, the hydrogen contained in the tube was replaced by nitrogen at a flow rate of 1 Lmin$^{-1}$ for a few minutes. The membranes were removed from the tube and left in the environment for 15 minutes. During this time, it was observed that the Pd—Ag layer of the five membranes began to spontaneously delaminate.

Example 3. Solubilization and Recycling of Pd and Ag Metals from a Pd—Ag Layer A layer of Pd—Ag weighing about 1 gram was introduced into a Teflon reactor together with about 20 ml of nitric acid-hydrochloric acid mixture (aqua regia). The Teflon reactor was closed and subjected to 130° C. for about 12 hours. The resulting solution was then concentrated and $PdCl_4$ and ClAg were obtained.

The invention claimed is:

1. A process for recycling and reusing a supported Pd membrane, said supported Pd membrane comprising a Pd layer and a support, the process comprising the following steps:
   i) introducing supported Pd membrane in a container,
   ii) pressurizing the container with a gas comprising at least 1% v/v of hydrogen at a hydrogen partial pressure equal to or greater than 1 kPa and at a temperature equal to or higher than 30° C. and equal to or lower than 80° C.,
   iii) depressurizing the container,
   iv) removing the hydrogen from the container by purging the reactor to remove said hydrogen while replacing said hydrogen by an inert gas,
   v) opening the container to remove the supported Pd membrane,
   vi) spontaneous delamination of the Pd layer from the support,
   vii) separating the Pd contained in the delaminated Pd layer by contacting said delaminated Pd layer in a reaction medium comprising at least one solubilizer and at least one oxidant of Pd, and
   viii) recovering the Pd in form of a Pd salt and the support for reuse.

2. The process according to claim 1, wherein the supported Pd membrane that is recycled comprises a support of a material selected from metal, glass, ceramic, zeolite, organic polymer, and mixtures thereof.

3. The process according to claim 1, wherein the supported Pd membrane comprises an intermediate layer between the support and the Pd layer, wherein the intermediate layer is a layer of ceramic, vanadium oxide, nickel, or nitride.

4. The process according to claim 1, wherein the supported Pd membrane comprises a layer of Pd or a layer of a Pd alloy.

5. The process according to claim 4, wherein the layer is Pd—Ag, Pd—Au, or Pd—Ag—Au.

6. The process according to claim 1 wherein the hydrogen partial pressure is equal to or greater than 5 kPa.

7. The process according to claim 1 in which the hydrogen partial pressure is 101 kPa (1 atm) and the temperature is between 30° C. and 80° C.

8. The process according to claim 1 in which the hydrogen partial pressure is between 150 and 200 kPa and the temperature is between 30° C. and 80° C.

9. The process according to claim 1, wherein: a) the Pd supported membrane comprises a layer of Pd—Ag1%, the partial pressure of hydrogen is 200 kPa, and the process temperature is 80° C. or lower; b) wherein the supported membrane comprises a layer of Pd—Ag5%, the partial pressure of hydrogen is 200 kPa, and the process temperature is 80° C. or lower, or c) wherein the supported membrane comprises a layer of Pd—Ag10%, the partial pressure of hydrogen is 200 kPa, and the process temperature is 80° C. or lower.

10. The process according to claim 1, wherein the gas comprising hydrogen used in step i) is pure $H_2$.

11. The process according to claim 1, wherein the gas comprising hydrogen used in step i) comprises an amount of $H_2$ between 1% and 99.90%.

12. The process according to claim 1, wherein two or more pressurization and depressurization steps (ii) and (iii) are carried out.

* * * * *